(12) United States Patent
Stiel

(10) Patent No.: US 6,543,355 B1
(45) Date of Patent: Apr. 8, 2003

(54) ROLLER FOR A ROTARY PRESS

(75) Inventor: Jürgen Alfred Stiel, Thüngen (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 09/673,249

(22) PCT Filed: Apr. 23, 1999

(86) PCT No.: PCT/DE99/01231
§ 371 (c)(1),
(2), (4) Date: Oct. 24, 2000

(87) PCT Pub. No.: WO99/55533
PCT Pub. Date: Nov. 4, 1999

(30) Foreign Application Priority Data

Apr. 24, 1998 (DE) .......................... 198 18 550

(51) Int. Cl.⁷ ................................. B41F 13/38
(52) U.S. Cl. ............... 101/248; 101/286; 101/DIG. 38; 310/20; 318/115
(58) Field of Search ................. 101/481, 486, 101/248, 286, DIG. 38; 310/12, 20; 318/115

(56) References Cited

U.S. PATENT DOCUMENTS

| | | | | |
|---|---|---|---|---|
| 3,394,295 A | * | 7/1968 | Cory ........................... | 318/115 |
| 4,234,831 A | | 11/1980 | Kemmer et al. | |
| 4,281,263 A | * | 7/1981 | Virolleau et al. ............. | 310/13 |
| 4,290,353 A | * | 9/1981 | Pav et al. ................. | 100/162 B |
| 4,607,197 A | * | 8/1986 | Conrad ......................... | 318/116 |
| 4,913,048 A | * | 4/1990 | Tittgemeyer ................. | 101/141 |
| 4,920,292 A | * | 4/1990 | Albrecht et al. ............. | 310/114 |
| 5,065,676 A | | 11/1991 | Hardin | |
| 5,230,285 A | | 7/1993 | Cogswell et al. | |
| 5,562,031 A | * | 10/1996 | Garner et al. ................. | 101/148 |
| 5,711,221 A | | 1/1998 | Compera et al. | |
| 5,771,805 A | | 6/1998 | Branas et al. | |
| 5,959,374 A | * | 9/1999 | Anderson et al. ............. | 310/13 |

FOREIGN PATENT DOCUMENTS

| | | |
|---|---|---|
| DE | 44 30 693 A1 | 8/1994 |
| DE | 196 03 765 A1 | 8/1997 |
| EP | 0 689 279 | 6/1995 |
| EP | 0 738 591 A1 | 3/1996 |
| EP | 0 788 879 | 2/1997 |
| JP | 62032051 | * 8/1985 |
| JP | 01210345 | * 2/1988 |
| JP | 8-70568 | 12/1996 |
| JP | 9-207319 | 12/1997 |

* cited by examiner

*Primary Examiner*—Andrew H. Hirshfeld
*Assistant Examiner*—Jill E Culler
(74) *Attorney, Agent, or Firm*—Jones, Tullar & Cooper PC

(57) ABSTRACT

A roller or a cylinder that is useable in a rotary printing press can accomplish both circumferential as well as axial movement. At least one component of an electric motor can accomplish both the axial and the circumferential movement of the roller. This motor can be integrated into the roller. The surface of the roller can be provided with a suitable covering.

6 Claims, 4 Drawing Sheets

ROLLER FOR A ROTARY PRESS

FIELD OF THE INVENTION

The present invention relates to a roller or a cylinder in a rotary printing press. The roller or cylinder is arranged to move in the circumferential, as well as in the axial direction.

DESCRIPTION OF THE PRIOR ART

A drive mechanism for a roller or a cylinder of a rotary printing press, consisting of an electric motor for a rotary drive, and a linear motor acting in the axial direction, is represented in DE 44 30 693 A1.

Disadvantageous here is a large requirement for space and a large outlay of electrical parts.

An electric motor with two degrees of freedom has furthermore become known from EP 0 689 279 A2.

EP 0 788 879 A1 describes a cylinder of a printing press with an electric motor for driving it in the circumferential direction. Here, the stator of the electric motor is fixed in place, and the rotor of the electric motor is moved in the axial direction by means of a second electric motor.

U.S. Pat. No. 4,234,831 A discloses an electric motor, whose stator has several electromagnets, and whose rotor has a single magnet.

DE 196 03 765 A1 shows a friction roller with a piston and cylinder located on the inside for generating a movement in the axial direction.

SUMMARY OF THE INVENTION

The present invention is based on the object of developing a roller or a cylinder for a rotary printing press.

In accordance with the present invention, this object is attained by the provision of a roller or cylinder that is arranged to perform a movement in the circumferential direction, as well as in the axial direction. A single motor is provided as the roller or cylinder drive mechanism. This motor has a rotor which rotates in the circumferential direction as well as being movable back and forth in the axial direction.

The advantages which can be achieved by means of the present invention consist, in particular, in possible savings in structural space, as well as electrical or also mechanical components. A movement of the roller or cylinder in the circumferential direction, as well as in the axial direction, is generated by means of one motor.

BRIEF DESCRIPTION OF THE DRAWINGS

Two preferred embodiments of the present invention are represented in the drawings and will be described in greater detail in what follows. Shown are in.

DESCRIPTION OF THE PREFERRED EMBODIMENTS

Figure 1:
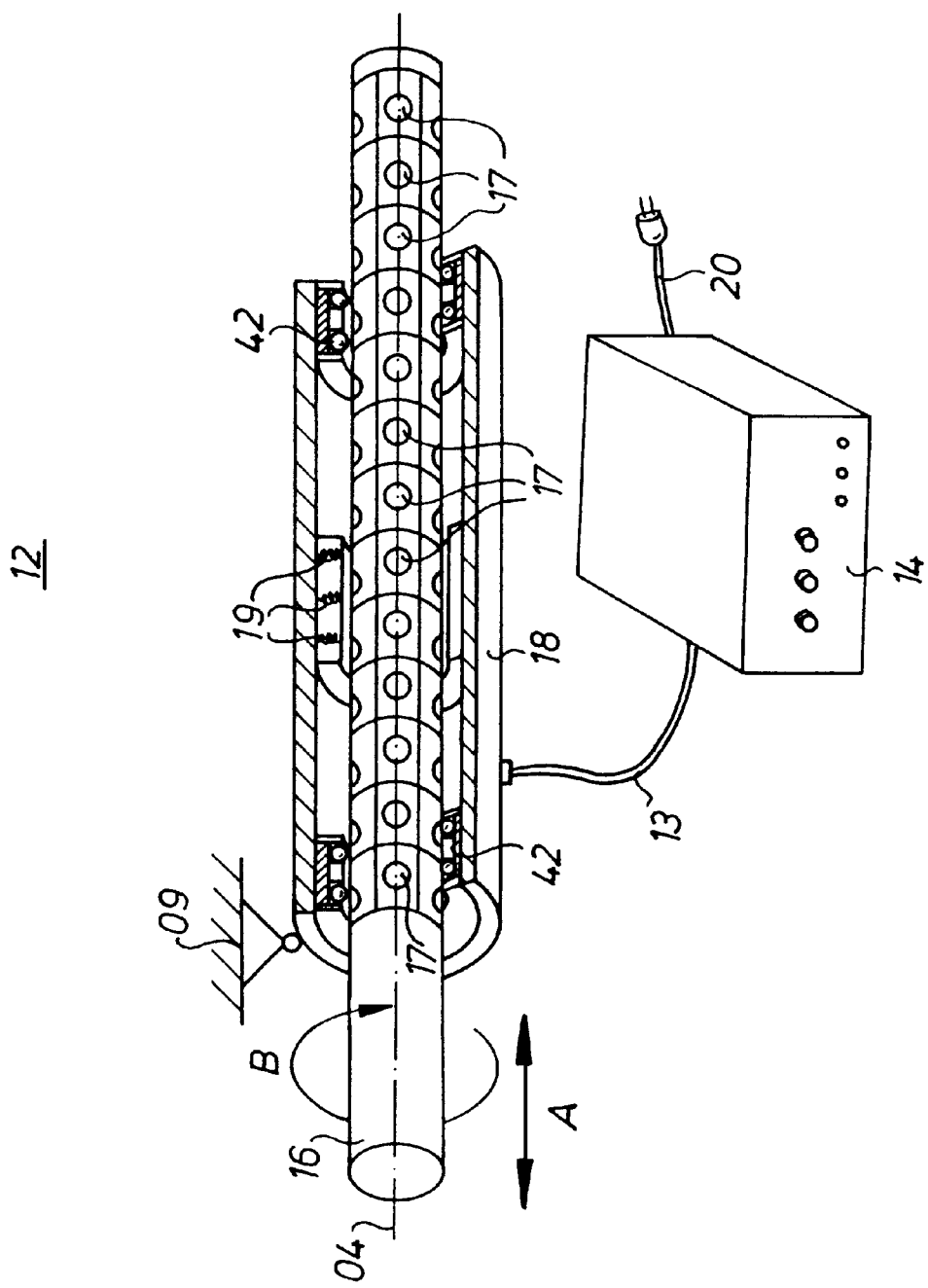
FIG. 1, a motor in a schematic perspective representation with two degrees of freedom for driving in the circumferential direction, as well as in the axial direction, and a computing unit, FIG. 2, the motor in accordance with FIG. 1 in an arrangement where it is fixed against relative rotation on a lateral frame and is in operational connection with a rotating component, FIG. 3, an active wiring diagram of the computing unit of the motor, and in FIG. 4, a second preferred embodiment of a drive mechanism for a rotating component with an integrated motor for driving in the circumferential direction and in the axial direction.

A driveable rotating component for a rotary printing press, in particular a cylinder or a roller 01 is connected, fixed against relative rotation, with its journals 02, 03. The journals 02, 03 and thus the roller or cylinder 01 can be moved back and forth in an axial direction A, i.e. in a direction extending parallel in relation to an axis of rotation 04 of the roller 01. These journals 02, 03 are rotatably seated in the circumferential direction B in bearings 06, 07 of lateral frames 08, 09, all as shown in FIG. 2. One cylinder journal, such as journal 03 is connected, for example by means of a coupling 11, with a motor 12 that is arranged outside of the roller 01, and which is in connection with a computer unit 14 via an electrical line 13 as may be seen by referring to both FIGS. 1 and 2.

Figure 2:
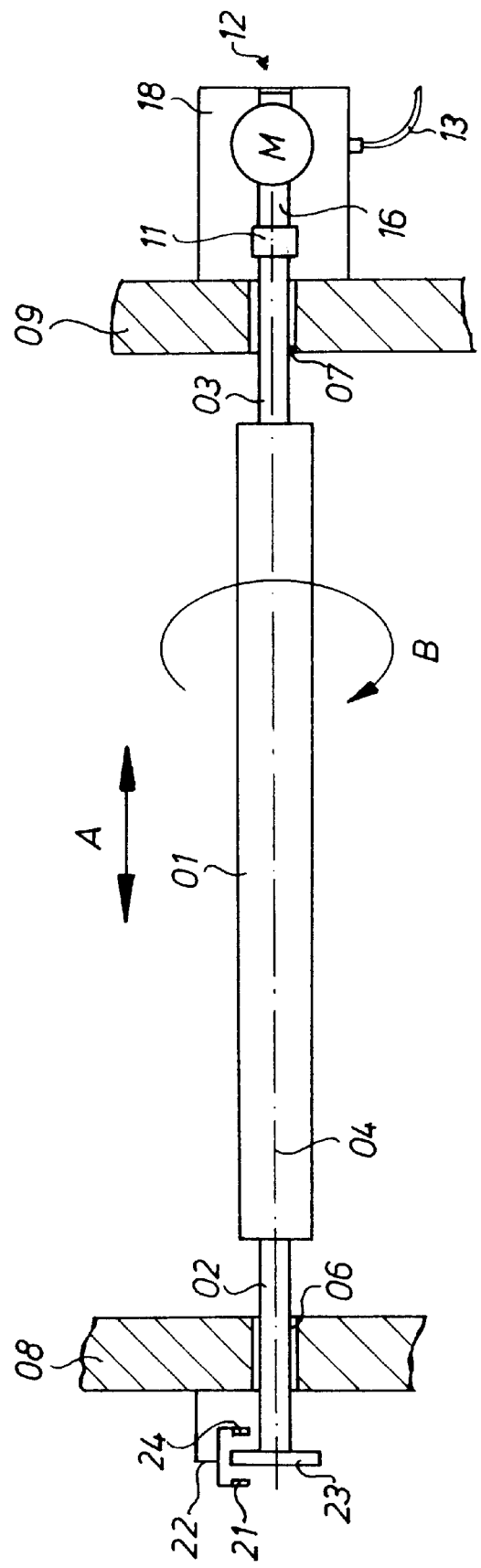

The motor 12 is shown in FIG. 1 and consists of an inner rotor 16, which can be rotated in the circumferential direction B, and which can also be moved back and forth in the axial direction A. On its surface, this rotor 16 has magnets 17, which are spaced apart in the circumferential direction B, as well as in the axial direction A. The inner rotor 16 is supported by an outer stator 18, which envelopes the inner rotor 16 and which is arranged fixed against relative rotation. Electromagnets 19, which are spaced apart from each other in the axial direction A, are arranged on the inner surface of the outer stator 18. A larger number of electromagnets 19 than are depicted in FIG. 1 can be arranged next to each other along the inner surface of the outer stator 18.

The axial distance between the axially adjacent ones of the magnets 17 of the rotating rotor 16 in respect to the distance between the electromagnets 19 of the stator 18, which is fixed against relative rotation, is for example 2:3. This arrangement is analogous to a brushless double pole three-phase rotary current motor.

The computer unit 14, which is connected via a line 13 with the outer stator 18 of the motor 12, can be connected with an energy source, not represented, via a lead 20.

Figure 3:
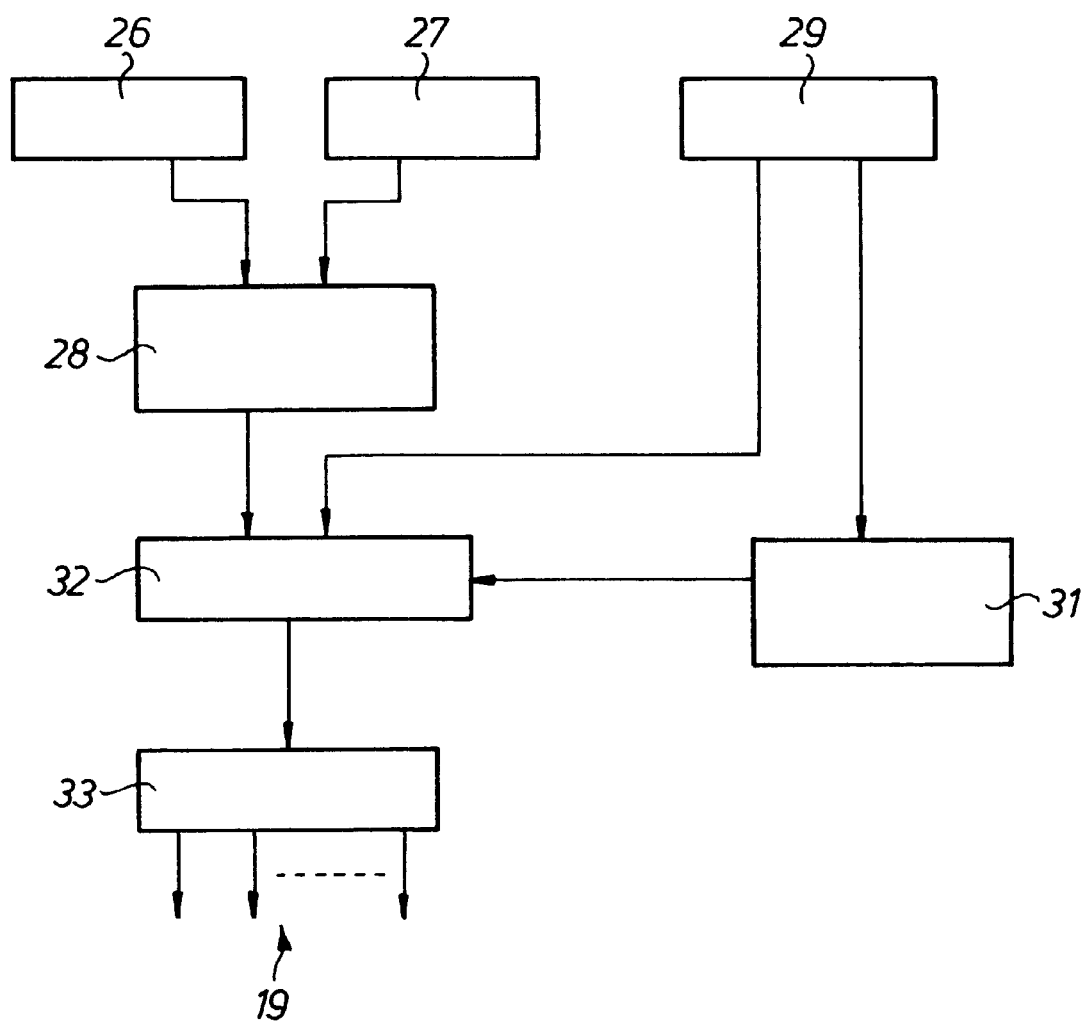

A first sensor 21 may be arranged, for example, on the non-driven journal 02 of the roller 01. Sensor 21 can be fastened in a holder 22 that is fixed in place on the lateral frame, and which holder 22 thus determines a distance of sensor 21 from a disk 23 arranged on the journal 02, all as shown in FIG. 1. By means of this, it is possible to determine the instantaneous axial position of the roller 01. A second sensor 24, that is also arranged on the holder 22, determines the instantaneous angle of rotation of the roller 01. Both sensors 21, 24 are connected by means of lines, not specifically represented, with a lift detector 26, or an angle of rotation detector 27, of the computer unit 14 as depicted in FIG. 3, which calculate the relative position of the rotor 16 and of the stator 18 in respect to each other, and pass on the result to a computing element 28 or to a memory. A value for the desired directions of axial and circumferential movement A and B is stated, by means of an input device 29, or also a memory for repeating data. Newly input or changed data are input into a computer 31, which determines the appropriate distances between the magnets 17 and the electromagnets 19 and passes on the result to a selection element 32. This selection element 32 leads to the required action of the triggered electromagnets 19 via an output element 33, all as depicted schematically in FIG. 3. With this, a combined movement of the inner rotor 16 in the axial direction A, as well as in the circumferential direction B becomes possible. Moreover, for example, there is the option for exerting a movement in only one direction, for example in the circumferential direction.

Figure 4:
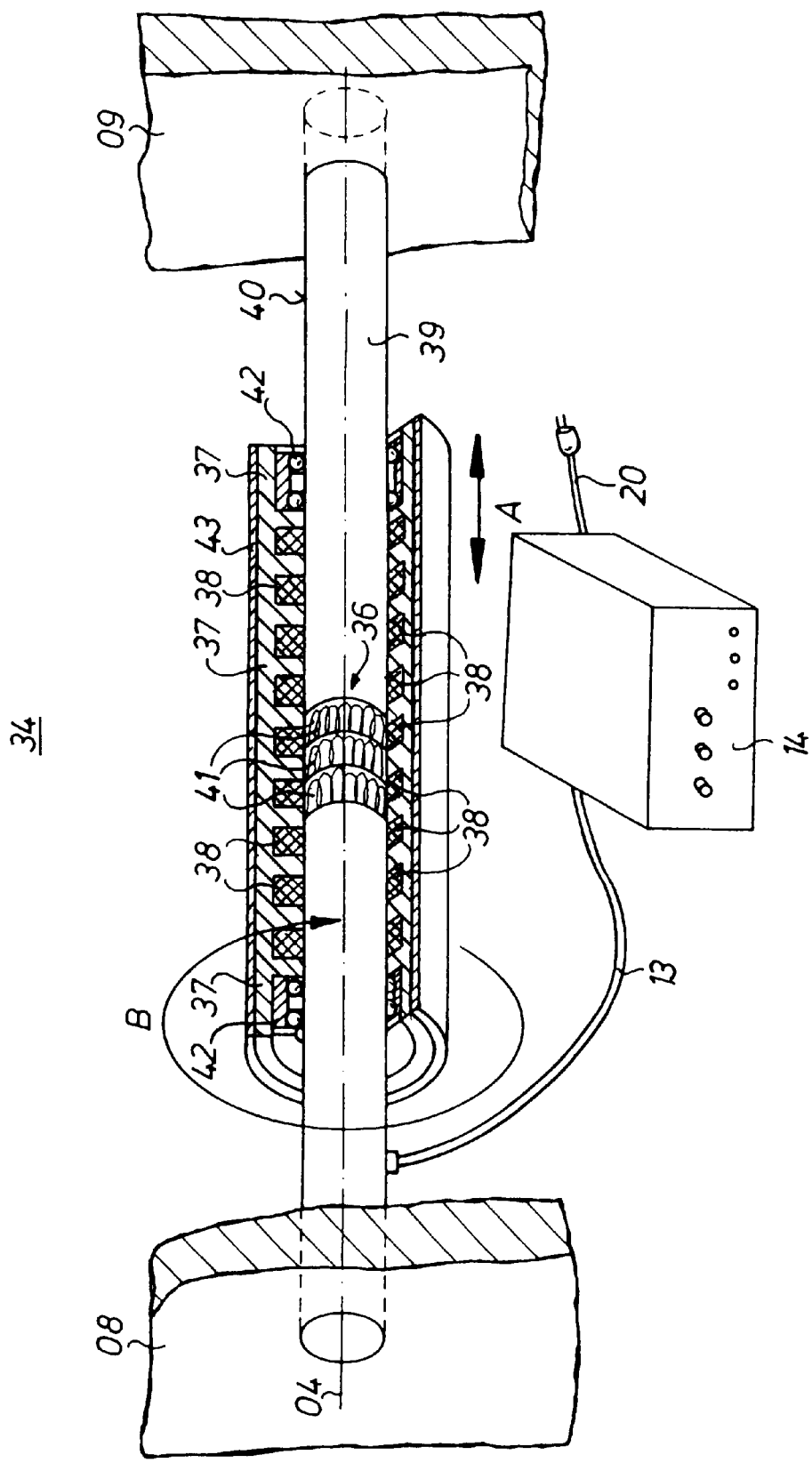

In accordance with a second preferred embodiment, as depicted in FIG. 4, a rotating component, in particular a roller 34, for example a friction roller or a cylinder for a rotary printing press, has a motor 36 integrated into the roller 34. This motor 36 consists of an outer hollow cylinder-shaped rotor 37, which can be rotated in the circumferential direction B, and which also can be moved back and forth in the axial direction. On its inner surface, this rotor 37 supports magnets 38, preferably permanent magnets, which are spaced apart from each other in the circumferential direction B, as well as in the axial direction A. Located in the hollow annular space defined by the outer rotor 37 which can be moved back and forth, a cylindrical inner stator 39 is coaxially arranged and is fixed against relative rotation. The stator 39, which is embodied as a shaft, has on its surface 40 a number of controllable electromagnets 41, which are spaced apart from each other in the axial direction A. A larger number of electromagnets 41 than shown in FIG. 4 can be arranged.

The rotor 37 is designed as a support tube 37 for an external coating 43 of the roller 34. This coating 43 can be arranged directly vulcanized on the support tube 37, for example. It is also possible to arrange a sleeve between the support tube 37 and the coating 43, so that a "sleeve", consisting of the sleeve and the coating, is arranged so that it can be released from the support tube 37 without being destroyed in the process.

The magnets 38 are, for example, arranged in radial bores of the support tube 37.

The shaft 39 of the roller 34 can also be made in several parts, wherein at least one journal is provided with magnets 38.

It is also possible to provide the support tube or outer rotor 37, viewed in the axial direction, only partially with magnets 38. The number of magnets 38 depends on the required force and on the lift to be generated.

It is also possible to embody a support tube and a rotor separately and to connect the support tube with the rotor.

Bearings 42, for example ball bearings, as seen in FIG. 4, are arranged between the rotor 37 and the stator 39, and also between the rotor 16 and the stator 18 of the first preferred embodiment, as depicted in FIG. 1.

The inner stator 39, which is fixed in place on the lateral frame, is connected with the computer unit 14 via a line 13. Analogously to the sensors 21, 24 represented in FIG. 2, sensors which are not specifically represented, are also arranged on the inner stator 39 or on one of the lateral frames 08, 09 and are used for detecting the position of the outer movable rotor 37 of the second preferred embodiment of the roller of the present invention, as shown in FIG. 4.

The roller 01, or 34 may have a coating 43 consisting of plastic or rubber. The coating 43 can also consist of a chromium cover.

In accordance with a further variation, the coating 43 can also be designed in such a way that the surface of the roller 34 can be used as a printing cylinder.

For removing heat, the roller 01, 34 can be cooled. For this purpose, a coolant can flow through the stator 16, 39, for example.

Thus, the motor 12, or 36 of the present invention generates the axial movement directly by means of magnetic forces without a rotatory movement being converted into a linear movement.

While preferred embodiments of a roller for a rotary press in accordance with the present invention have been set forth fully and completely hereinabove, it will be apparent to one of skill in the art that a number of changes in, for example, the overall size of the roller, the type of printing press it is to be used in, and the like could be made without departing from the true spirit and scope of the present invention which is accordingly to be limited only by the following claims.

What is claimed is:

1. A roller for use in a rotary printing press and adapted for both axial and circumferential movement, said roller comprising:

a rotatable roller support tube;

a coating on an outer surface of said rotatable roller support tube;

a plurality of permanent magnets on an inner surface of said roller support tube, said plurality of permanent magnets being axially and circumferentially spaced on said inner surface;

a fixed shaft supporting said rotatable roller support tube; and a plurality of electromagnets on said fixed shaft, said rotatable roller support tube forming a rotor of an electric motor integrated into said roller, said fixed shaft forming a stator of said electric motor, said electric motor directly generating axial and circumferential movement of said rotatable roller support tube.

2. The roller of claim 1 wherein said coating is applied directly to said rotatable roller support tube.

3. The roller of claim 1 further including a sleeve secured on said outer surface of said rotatable roller support tube and wherein said coating is on said sleeve.

4. The roller of claim 1 wherein said coating is plastic.

5. The roller of claim 1 wherein said coating is chromium.

6. The roller of claim 1 wherein said coating is rubber.

* * * * *